United States Patent
Sun

(10) Patent No.: US 9,434,636 B2
(45) Date of Patent: *Sep. 6, 2016

(54) PHOSPHATE OPTICAL GLASS

(75) Inventor: Wei Sun, Chengdu (CN)

(73) Assignee: CDGM GLASS CO., LTD, Chengdu (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/358,467

(22) PCT Filed: Feb. 6, 2012

(86) PCT No.: PCT/CN2012/070885
§ 371 (c)(1),
(2), (4) Date: May 15, 2014

(87) PCT Pub. No.: WO2013/082880
PCT Pub. Date: Jun. 13, 2013

(65) Prior Publication Data
US 2014/0323285 A1    Oct. 30, 2014

(30) Foreign Application Priority Data
Dec. 8, 2011  (CN) .......................... 2011 1 0405144

(51) Int. Cl.
*C03C 3/21* (2006.01)
*C03C 3/19* (2006.01)
*C03C 3/064* (2006.01)

(52) U.S. Cl.
CPC ................ *C03C 3/21* (2013.01); *C03C 3/064* (2013.01); *C03C 3/19* (2013.01)

(58) Field of Classification Search
CPC ............. C03C 3/21; C03C 3/19; C03C 3/064
See application file for complete search history.

(56) References Cited

U.S. PATENT DOCUMENTS

| | | | | |
|---|---|---|---|---|
| 4,115,131 A * | 9/1978 | Ishibashi et al. | ............... | 501/42 |
| 4,261,751 A * | 4/1981 | Nakamura et al. | ............. | 501/42 |
| 4,996,173 A * | 2/1991 | Tachiwana | ..................... | 501/73 |
| 2002/0073735 A1* | 6/2002 | Hayashi et al. | .............. | 65/32.1 |
| 2004/0018933 A1* | 1/2004 | Ogino et al. | .................... | 501/45 |
| 2005/0049132 A1* | 3/2005 | Shiraishi | ......................... | 501/46 |
| 2005/0164862 A1 | 7/2005 | Shiraishi | | |
| 2005/0202952 A1* | 9/2005 | Fujiwara et al. | .............. | 501/77 |
| 2006/0058171 A1* | 3/2006 | Izuki | ............................. | 501/47 |
| 2009/0097146 A1* | 4/2009 | Oogaki | ....................... | 359/894 |
| 2010/0004112 A1* | 1/2010 | Ohkawa et al. | ............... | 501/42 |
| 2012/0134027 A1* | 5/2012 | Zou et al. | ..................... | 359/601 |
| 2012/0135199 A1* | 5/2012 | Satou et al. | .................. | 428/172 |
| 2012/0177914 A1* | 7/2012 | Igari et al. | .................... | 428/336 |

FOREIGN PATENT DOCUMENTS

| | | |
|---|---|---|
| CN | 1657461 A | 8/2005 |
| CN | 101817638 A | 9/2010 |
| CN | 102241478 A | 11/2011 |
| JP | B2-3260046 | 2/2002 |

OTHER PUBLICATIONS

Shelby, J.E., Introduction to Glass Science and Technology, 1997, The Royal Society of Chemistry, Chapter 3, pp. 25-47.*
Shelby, J.E., Introduction to Glass Science and Technology, 1997, The Royal Society of Chemistry, Chapter 6, pp. 69-106.*
Sep. 13, 2012 Written Opinion issued in International Application No. PCT/CN2012/070885.
Jun. 10, 2014 International Preliminary Report on Patentability issued in International Application No. PCT/CN2012/070885.
Sep. 13, 2012 International Search Report issued in International Application No. PCT/CN2012/070885.

* cited by examiner

*Primary Examiner* — Anthony J Green
*Assistant Examiner* — Elizabeth A Bolden
(74) *Attorney, Agent, or Firm* — Oliff PLC

(57) ABSTRACT

The invention including phosphate optical glass with refractivity ranging from 1.93 to 1.95 and the Abbe number ranging from 16 to 19, with a low liquidus temperature. The phosphate optical glass, including: 5 to 25 wt % of $NaPO_3$, 1 to 20 wt % of $KPO_3$, 2 to 15 wt % of $P_2O_5$, 0 to 5 wt % of BaO, 0 to 10 wt % of $Ba(PO_3)_2$, more than 0 but less than 2 wt % of $B_2O_3$, 5 to 25 wt % of $TiO_2$, 35 to 55 wt % of $Nb_2O_5$, and 0 to 5 wt % of $SiO_2$. Refractivity of phosphate optical glass can reach 1.93 to 1.95, the Abbe number can reach 16 to 19, the liquidus temperature is below 1,120° C., the processing property during melting is good, the glass surface is unlikely to be devitrified during the processing of the glass, and can be formed easily.

22 Claims, No Drawings

PHOSPHATE OPTICAL GLASS

FIELD OF THE INVENTION

The invention relates to a phosphate optical glass.

RELATED ART

With the rapid development of novel optoelectronic products, an optical glass with the refractivity ranging from 1.93 to 1.95 and the Abbe number ranging from 16 to 19 is in great demand. According to the relation between the refractivity and the Abbe number, the optical glass with the refractivity ranging from 1.93 to 1.95 and the Abbe number ranging from 16 to 19 is not suitable for an $SiO_2$—$Nb_2O_5$—$TiO_2$—$BaO$—$R_2O$ formulation system due to the fact that the glass system in this case is liable to be extremely unstable, uniform products with good inherent quality are unavailable, and the transmissivity is unsatisfactory. However, a phosphate formulation system can realize obvious stability of the glass and guarantee the transmissivity of visible light.

Besides, during the melting of phosphate glass, it is ideal to minimize the liquidus temperature. In other words, to realize stable production of the phosphate glass, a formulation system capable of minimizing the liquidus temperature shall be adopted during the design of the glass formulation. If the liquidus temperature of the glass is high, the glass during the melting will be formed difficulty, the processing property will be poor, and crystals will appear on the surface of the glass during the following secondary processing of the glass, which will affect the surface quality of the processed product.

DISCLOSURE OF THE INVENTION

A technical problem to be solved by the invention is to provide a phosphate optical glass with the refractivity ranging from 1.93 to 1.95 and the Abbe number ranging from 16 to 19, which has a minimized the liquidus temperature.

To solve the technical problem, the invention provides the phosphate optical glass, consisting essentially of: 5 to 25 wt % of $NaPO_3$, 1 to 20 wt % of $KPO_3$, 2 to 15 wt % of $P_2O_5$, 0 to 5 wt % of BaO, 0 to 10 wt % of $Ba(PO_3)_2$, more than 0 but less than 2 wt % of $B_2O_3$, 5 to 25 wt % of $TiO_2$, 35 to 55 wt % of $Nb_2O_5$, and 0 to 5 wt % of $SiO_2$.

Furthermore, the content of $B_2O_3$ is more than 0 but less than 1 wt %.

Furthermore, the content of $B_2O_3$ is more than 0 but less than 0.8 wt %.

Furthermore, the content of $TiO_2$ is 10 to 20 wt %.

Furthermore, the content of $TiO_2$ is more than 14% but less than 18 wt %.

Furthermore, the content of $Nb_2O_5$ is 40 to 48 wt %.

Furthermore, the content of $NaPO_3$ is 10 to 20 wt %.

Furthermore, the content of $KPO_3$ is 5 to 15 wt %.

Furthermore, the content of $Ba(PO_3)_2$ is 1 to 5 wt %.

Furthermore, the content of $P_2O_5$ is 5 to 10 wt %.

Furthermore, the content of BaO is 0.1 to 2 wt %.

Furthermore, the content of $SiO_2$ is 0.1 to 2 wt %.

Furthermore, the total content of $NaPO_3$ and $KPO_3$ is 20 to 30 wt %.

An optical element is formed of said phosphate optical glass.

The phosphate optical glass provided by the invention is advantageous in that the refractivity of the glass can reach 1.93 to 1.95, the Abbe number can reach 16 to 19, the liquidus temperature is below 1,120° C., the processing property during the melting is good, the glass can be formed easily, and the surface of the glass is unlikely to be devitrified during the following processing of the glass.

EMBODIMENTS

Through a great number of researches and experiments, the present inventor found that a glass composition with low liquidus temperature and required refractivity and Abbe number is available through designing specific glass formulation, especially controlling the content of $B_2O_3$ in the formulation system.

The invention provides a phosphate optical glass, the invention provides the phosphate optical glass, consisting essentially of: 5 to 25 wt % of $NaPO_3$, 1 to 20 wt % of $KPO_3$, 2 to 15 wt % of $P_2O_5$, 0 to 5 wt % of BaO, 0 to 10 wt % of $Ba(PO_3)_2$, more than 0 but less than 2 wt % of $B_2O_3$, 5 to 25 wt % of $TiO_2$, 35 to 55 wt % of $Nb_2O_5$, and 0 to 5 wt % of $SiO_2$.

$NaPO_3$ is an essential component of the phosphate optical glass, which can promote stable formation of the glass, effectively lower the glass melting temperature and guarantee high transmissivity in a visible region, so the content of $NaPO_3$ shall be at least 5 wt %, otherwise said effects are unavailable. However, when the content exceeds 25 wt %, the optical performance with high refractivity cannot be realized. Therefore, the content of $NaPO_3$ in the invention is 5 to 25 wt %, preferably 10 to 20 wt %, more preferably 12 to 16 wt %.

Also as an essential component of the phosphate optical glass, $KPO_3$ can more effectively promote stable formation of the glass when being mixed with $NaPO_3$, which is capable of lowering the glass melting temperature and guaranteeing high transmissivity in the visible region, so the content of $KPO_3$ shall be at least 1 wt %, otherwise said effects are unavailable. However, the devitrification resistance of the glass is liable to be degraded when the content of $KPO_3$ exceeds 20 wt %, so the content of $KPO_3$ is 1 to 20 wt %, preferably 5 to 15 wt %, more preferably 8 to 12 wt %.

The present inventor also found that, the thermal shock resistance of the glass can be improved via controlling the content of $NaPO_3$ and $KPO_3$ due to the fact that the thermal expansion coefficient of the glass is liable to be increased to result in breaking during the following processing when the total content of $NaPO_3$ and $KPO_3$ exceeds 35 wt %. Therefore, the total content of $NaPO_3$ and $KPO_3$ is 6 to 35 wt %, more preferably 20 to 30 wt %.

As a framework component of the phosphate formulation system, $P_2O_5$ is mainly used to lower the melting temperature and improve the transmissivity of the glass. However, the effects are not obvious when the content of $P_2O_5$ is less than 2 wt %, and the refractivity of the glass is liable to be significantly decreased and the required optical performance is unavailable when the content of $P_2O_5$ exceeds 15 wt %. Therefore, the content of $P_2O_5$ is 2 to 15 wt %, preferably 5 to 10 wt %.

After an appropriate amount of BaO is used, the devitrification property of the glass can be improved, the Abbe number of the glass provided by the invention can be adjusted, and the glass forming property during the melting can be better. Therefore, the content of BaO is 0 to 5 wt %, preferably 0.1 to 2 wt %.

$Ba(PO_3)_2$ can improve the devitrification resistance of the glass simultaneously with adjust the refractivity of the glass. In the invention, an appropriate amount of $Ba(PO_3)_2$ can be used for adjusting phosphoric acid and/or BaO in the formulation system; besides, after $Ba(PO_3)_2$ is used in the formulation system, the content of $P_2O_5$ in the system can be minimized due to the fact that $P_2O_5$ is more active than $Ba(PO_3)_2$ to result in instable melting of the glass. However, high dispersion of the glass cannot be realized when the content of $Ba(PO_3)_2$ exceeds 10 wt %, so the content of $Ba(PO_3)_2$ in the glass provided by the invention is 0 to 10 wt %, preferably 1 to 5 wt %, more preferably more than 2 wt % but less than 4 wt %.

$B_2O_3$ is an effective component for improving the melting behavior and reducing the melting temperature of the glass. In addition, a little amount of $B_2O_3$ used in the invention significantly reduces the liquidus temperature of the glass; however, when the content of $B_2O_3$ exceeds 2 wt % or $B_2O_3$ is not used, the effect of lowering the liquidus temperature of the glass is liable to be poor obviously. Therefore, the effect of lowering the liquidus temperature of the glass is best when the content of $B_2O_3$ is more than 0 but less than 2 wt %, preferably more than 0 but less than 1 wt %, more preferably more than 0 but less than 0.8 wt %.

$Nb_2O_5$ is an effective component for realizing high refractivity and adjusting the Abbe number of the glass simultaneously with inhibiting devitrification. In addition, the present inventor found that the thermal expansion coefficient of the glass can be effectively reduced and the thermal shock resistance of the glass can be enhanced by optimizing the content of $Nb_2O_5$. Said effects are unavailable when the content of $Nb_2O_5$ is less than 35 wt %, but the glass cost is liable to be high devitrification is liable to be occur when the content of $Nb_2O_5$ exceeds 55 wt %. Therefore, the content of $Nb_2O_5$ is 35 to 55 wt %, preferably 40 to 48 wt %, more preferably 45 to 48 wt %.

$TiO_2$ is an essential component for realizing optical performance indexes of the glass, which can effectively reduce the thermal expansion coefficient of the glass the same as $Nb_2O_5$. Due to high cost of $Nb_2O_5$, the content of $TiO_2$ is appropriately increased to realize the optical performance and strong thermal shock resistance, thereby effectively decreasing the content of $Nb_2O_5$. The required effects are unavailable when the content of $TiO_2$ is less than 5 wt %, but the devitrification resistance and coloring degree of the glass are liable to be poor when the content of $TiO_2$ exceeds 25 wt %. Therefore, the content of $TiO_2$ in the invention is 5 to 25 wt %, preferably 10 to 20 wt %, more preferably more than 14 wt % but less than 18 wt %.

$SiO_2$ is an optional component of the glass provided by the invention, and an appropriate amount of $SiO_2$ also can effectively reduce the thermal expansion coefficient, enhance the chemical resistance and improve the stability of the glass. However, the glass is liable to be refractory when the content of $SiO_2$ exceeds 5 wt %. Therefore, the content of $SiO_2$ is 0 to 5 wt %, preferably 0.1 to 2 wt %, more preferably 0.1 to 1 wt %.

For the phosphate glass composition, bubbles will be remained and are difficulty to be exhausted completely due to over low melting temperature, so a fining agent $Sb_2O_3$ is usually used during the melting. However, $Sb_2O_3$ is always required to be used together with nitrates, which is liable to increase the discharge of nitrogen oxides during the melting of the glass composition, thus causing certain pollution to the environment. To control the pollutant emission in the air, $Ba(PO_3)_2$ and BaO are used in the invention to improve the activity of the glass, so the melting of the glass composition can still be realized without using the fining agent $Sb_2O_3$.

The refractivity of the optical glass provided by the invention ranges from 1.93 to 1.95, and the Abbe number ranges from 16 to 19; preferably, the refractivity of the optical glass provided by the invention ranges from 1.94 to 1.95, and the Abbe number ranges from 17 to 19.

To realize stable production of the glass provided by the invention, it is important to control the liquidus temperature of the glass below 1,120° C. The liquidus temperature of the glass is preferably below 1,100° C., more preferably below 1,090° C.

For the glass provided by the invention, the thermal expansion coefficient α (at 20 to 300° C.) is less than $59 \times 10^{-7}$/° C., preferably less than $57 \times 10^{-7}$/° C., more preferably less than $53 \times 10^{-7}$/° C.

The invention also provides an optical element formed of said glass, which has various properties of said glass.

The performance parameters of the glass provided by the invention are measured as follows:

The refractivity (nd) and the Abbe number are measured as per the *Method for Testing the Refractivity and Dispersion Coefficient of Colorless Optical Glass* (*GB/T* 7962.1-1987).

The devitrification property of the glass is measured by a gradient-furnace method which comprises the following steps: processing the glass into samples (180 mm×10 mm×10 mm), polishing lateral sides, placing the samples into a furnace having a temperature gradient, taking out the samples after keeping the temperature for 4 hours, and observing the devitrification of glass under a microscope, wherein the maximum temperature corresponding to the appearance of crystals is the liquidus temperature of the glass.

The thermal expansion coefficient α (at 20 to 120° C.) refers to the elongation in unit length of the glass per degree rise within a range of 20 to 120° C., which is measured as per the method specified in GB/T7962.16-1987.

A method for preparing the glass provided by the invention has no special restrictions, just conducted as per the method well known to technical personnel in the field. The optical glass is obtained by melting the raw materials, settling, homogenizing, cooling, casting into a preheated metal mold and annealing. Raw materials such as $NaPO_3$, $KPO_3$ and $Ba(PO_3)_2$ that are stable in state are used during the preparation of the glass, thus realizing stable production.

The glass provided by examples 1 to 20 in the invention is prepared by the following steps: proportionally weighing the raw materials corresponding to the glass composition in embodiments 1 to 20, mixing fully and then adding into a platinum crucible, melting at 1,000 to 1,300° C., settling, homogenizing and then cooling; casting the fused glass into the preheated metal mold at about 550 to 600° C.; and then placing the fused glass cast into the preheated metal mold together with the metal mold into an annealing furnace, annealing slowly to obtain the glass, and measuring related parameters of the glass. The glass provided by examples 1 to 20 has advantages that no crystals appear on the surface during the following secondary processing and the surface quality is good.

The refractivity, Abbe number, liquidus temperature and thermal expansion coefficient of the glass provided by examples 1 to 20 are illustrated in Tables 1 to 4.

TABLE 1

| | | Examples 1 to 5 | | | | |
|---|---|---|---|---|---|---|
| | | 1 | 2 | 3 | 4 | 5 |
| Composition (wt %) | $NaPO_3$ | 15 | 16.3 | 17.2 | 18.5 | 9.1 |
| | $KPO_3$ | 9.8 | 8.5 | 7.7 | 6.4 | 15 |
| | $Ba(PO_3)_2$ | 4.9 | 3.4 | 2.6 | 4.1 | 7.9 |
| | $P_2O_5$ | 7.1 | 8.8 | 9.6 | 7.9 | 4.5 |
| | $BaO$ | 0.1 | 0.4 | 0.6 | 1.2 | 1.7 |
| | $B_2O_3$ | 0.1 | 0.3 | 0.4 | 0.7 | 0.9 |
| | $TiO_2$ | 14.9 | 15.9 | 22.5 | 21.6 | 15.8 |
| | $Nb_2O_5$ | 45.1 | 46.4 | 39.4 | 38.9 | 43.4 |
| | $SiO_2$ | 3 | | | 0.7 | 1.7 |
| Total | | 100 | 100 | 100 | 100 | 100 |
| Performance Parameters | nd | 1.945 | 1.947 | 1.931 | 1.930 | 1.940 |
| | vd | 16.1 | 16.3 | 17.0 | 18.4 | 18.7 |
| | Liquidus temperature (° C.) | 1108 | 1107 | 1109 | 1100 | 1120 |
| | Thermal expansion coefficient α (at 20 to 120° C.) | $58 \times 10^{-7}/°C.$ | $59 \times 10^{-7}/°C.$ | $54 \times 10^{-7}/°C.$ | $55 \times 10^{-7}/°C.$ | $58 \times 10^{-7}/°C.$ |

TABLE 2

| | | Examples 6 to 10 | | | | |
|---|---|---|---|---|---|---|
| | | 6 | 7 | 8 | 9 | 10 |
| Composition (wt %) | $NaPO_3$ | 10 | 11.3 | 12.1 | 13.4 | 14.7 |
| | $KPO_3$ | 14.7 | 13.2 | 12.1 | 11.8 | 10.3 |
| | $Ba(PO_3)_2$ | 7.3 | 6.5 | 5.2 | 5.7 | 3.3 |
| | $P_2O_5$ | 5 | 5.6 | 6.4 | 6.8 | 7.5 |
| | $BaO$ | 2 | 2.2 | 2.4 | 3.1 | 0.5 |
| | $B_2O_3$ | 0.7 | 0.8 | 0.7 | 0.6 | 0.7 |
| | $TiO_2$ | 19.4 | 18.3 | 17 | 16.5 | 15.9 |
| | $Nb_2O_5$ | 40.4 | 41.5 | 44.1 | 42.1 | 46.6 |
| | $SiO_2$ | 0.5 | 0.6 | | | 0.5 |
| Total | | 100 | 100 | 100 | 100 | 100 |
| Performance Parameters | nd | 1.938 | 1.942 | 1.948 | 1.941 | 1.948 |
| | vd | 18.02 | 17.81 | 17.94 | 18.43 | 17.96 |
| | Liquidus temperature (° C.) | 1102 | 1100 | 1103 | 1105 | 1105 |
| | Thermal expansion coefficient α (at 20 to 120° C.) | $57 \times 10^{-7}/°C.$ | $55 \times 10^{-7}/°C.$ | $56 \times 10^{-7}/°C.$ | $55 \times 10^{-7}/°C.$ | $55 \times 10^{-7}/°C.$ |

TABLE 3

| | | Examples 11 to 15 | | | | |
|---|---|---|---|---|---|---|
| | | 11 | 12 | 13 | 14 | 15 |
| Composition (wt %) | $NaPO_3$ | 14.5 | 15.3 | 14.8 | 15 | 13.7 |
| | $KPO_3$ | 9.8 | 10.8 | 11.5 | 10.1 | 11.9 |
| | $Ba(PO_3)_2$ | 3.1 | 3.8 | 4.2 | 3 | 5.1 |
| | $P_2O_5$ | 7.5 | 8.3 | 9.1 | 7.1 | 6.8 |
| | $BaO$ | 0.8 | 1.1 | 2.3 | 0.4 | 1.5 |
| | $B_2O_3$ | 0.7 | 0.8 | 0.2 | 0.4 | 0.5 |
| | $TiO_2$ | 16.2 | 13.8 | 16.7 | 15.3 | 15.5 |
| | $Nb_2O_5$ | 47 | 43.9 | 41.2 | 48.7 | 45 |
| | $SiO_2$ | 0.4 | 2.2 | | | |
| Total | | 100 | 100 | 100 | 100 | 100 |
| Performance Parameters | nd | 1.948 | 1.939 | 1.940 | 1.949 | 1.938 |
| | vd | 17.96 | 17.70 | 17.98 | 17.97 | 18.16 |
| | Liquidus temperature (° C.) | 1103 | 1095 | 1110 | 1107 | 1108 |

TABLE 3-continued

|  | Examples 11 to 15 | | | | |
| --- | --- | --- | --- | --- | --- |
|  | 11 | 12 | 13 | 14 | 15 |
| Thermal expansion coefficient α (at 20 to 120° C.) | $59 \times 10^{-7}/°C.$ | $56 \times 10^{-7}/°C.$ | $55 \times 10^{-7}/°C.$ | $59 \times 10^{-7}/°C.$ | $59 \times 10^{-7}/°C.$ |

TABLE 4

| | | Examples 16 to 20 | | | | |
| --- | --- | --- | --- | --- | --- | --- |
| | | 16 | 17 | 18 | 19 | 20 |
| Composition (wt %) | $NaPO_3$ | 18.7 | 19.4 | 13.6 | 14.4 | 10.1 |
| | $KPO_3$ | 9.8 | 8.1 | 10.6 | 11.3 | 12.8 |
| | $Ba(PO_3)_2$ | 2.5 | | 5.4 | 5.4 | 5.1 |
| | $P_2O_5$ | 11.5 | 12.6 | 8.5 | 9.3 | 13 |
| | BaO | | 4.6 | 4.4 | 4.7 | 4 |
| | $B_2O_3$ | 0.6 | 1.5 | 0.4 | 1 | 0.8 |
| | $TiO_2$ | 13.8 | 8.5 | 7.4 | 6.1 | 4.2 |
| | $Nb_2O_5$ | 43.1 | 45.3 | 49.4 | 47.8 | 50 |
| | $SiO_2$ | | | 0.3 | | |
| Total | | 100 | 100 | 100 | 100 | 100 |
| Performance Parameters | nd | 1.948 | 1.940 | 1.942 | 1.931 | 1.938 |
| | vd | 18.05 | 17.84 | 18.04 | 18.15 | 17.96 |
| | Liquidus temperature (° C.) | 1090 | 1120 | 1112 | 1120 | 1095 |
| | Thermal expansion coefficient α (at 20 to 120° C.) | $59 \times 10^{-7}/°C.$ | $58 \times 10^{-7}/°C.$ | $59 \times 10^{-7}/°C.$ | $59 \times 10^{-7}/°C.$ | $59 \times 10^{-7}/°C.$ |

As illustrated from the examples, the glass and the optical element provided by the invention have low liquidus temperature and thermal expansion coefficient, good stability and thermal shock resistance with no fining agent during the melting, the refractivity ranging from 1.93 to 1.95 and the Abbe number ranging from 16 to 19, which meet requirements of novel optoelectronic products in modern times.

The invention claimed is:

1. A phosphate optical glass formed from a raw material mixture consisting essentially of: 5 to 25 wt % of $NaPO_3$, 1 to 20 wt % of $KPO_3$, 2 to 15 wt % of $P_2O_5$, 0 to 5 wt % of BaO, 0 to 10 wt % of $Ba(PO_3)_2$, more than 0 but less than 2 wt % of $B_2O_3$, 5 to 25 wt % of $TiO_2$, 35 to 55 wt % of $Nb_2O_5$, and 0 to 5 wt % of $SiO_2$ wherein the phosphate optical glass is free of $Sb_2O_3$.

2. The phosphate optical glass according to claim 1, wherein the content of $B_2O_3$ is more than 0 but less than 1%.

3. The phosphate optical glass as recited in claim 1, wherein the content of $B_2O_3$ is more than 0 but less than 0.8%.

4. The phosphate optical glass as recited in claim 1, wherein the content of $TiO_2$ is 10 to 20%.

5. The phosphate optical glass as recited in claim 1, wherein the content of $TiO_2$ is more than 14% but less than 18%.

6. The phosphate optical glass as recited in claim 1, wherein the content of $Nb_2O_5$ is 40 to 48%.

7. The phosphate optical glass as recited in claim 1, wherein the content of $Nb_2O_5$ is 45 to 48%.

8. The phosphate optical glass as recited in claim 1, wherein the content of $NaPO_3$ is 10 to 20%.

9. The phosphate optical glass as recited in claim 1, wherein the content of $NaPO_3$ is 12 to 16%.

10. The phosphate optical glass as recited in claim 1, wherein the content of $KPO_3$ is 5 to 15%.

11. The phosphate optical glass as recited in claim 1, wherein the content of $KPO_3$ is 8 to 12%.

12. The phosphate optical glass as recited in claim 1, wherein the content of $Ba(PO_3)_2$ is 1 to 5%.

13. The phosphate optical glass as recited in claim 1, wherein the content of $Ba(PO_3)_2$ is more than 2% but less than 4%.

14. The phosphate optical glass as recited in claim 1, wherein the content of $P_2O_5$ is 5 to 10%.

15. The phosphate optical glass as recited in claim 1, wherein the content of BaO is 0.1 to 2%.

16. The phosphate optical glass as recited in claim 1, wherein the content of $SiO_2$ is 0.1 to 2%.

17. The phosphate optical glass as recited in claim 1, wherein the content of $SiO_2$ is 0.1 to 1%.

18. The phosphate optical glass as recited in claim 1, wherein the total content of $NaPO_3$ and $KPO_3$ is 20 to 30%.

19. The phosphate optical glass as recited in claim 1, wherein the total content of $NaPO_3$ and $KPO_3$ is 6 to 35%.

20. The phosphate optical glass as recited in claim 1, wherein the refractivity of said optical glass ranges from 1.93 to 1.95, and the Abbe number ranges from 16 to 19.

21. The phosphate optical glass as recited in claim 1, wherein the liquidus temperature of said optical glass is controlled below 1,120° C.

22. An optical element made of the phosphate optical glass according to claim 1.

* * * * *